United States Patent [19]

Gomez et al.

[11] 4,289,664

[45] Sep. 15, 1981

[54] GLASS FIBER BONDING RESINS

[75] Inventors: I. Luis Gomez, Longmeadow; Robert Cole, Three Rivers, both of Mass.

[73] Assignee: Monsanto Company, St. Louis, Mo.

[21] Appl. No.: 140,280

[22] Filed: Apr. 14, 1980

[51] Int. Cl.³ .................. B32B 17/04; C03C 27/10; C08G 8/10
[52] U.S. Cl. .................. 260/19 R; 65/3 C; 65/4 R; 156/181; 156/335; 260/19 N; 260/31.4 R
[58] Field of Search ............ 260/19 R, 19 N, 31.4 R; 65/3 C, 4 R; 156/181, 335

[56] References Cited

U.S. PATENT DOCUMENTS

| | | | |
|---|---|---|---|
| 1,599,627 | 9/1926 | Achtmeyer | 260/19 R |
| 1,633,976 | 6/1927 | Brown | 260/19 R |
| 1,988,465 | 1/1935 | Seebach | 260/19 R |
| 1,999,717 | 4/1935 | Billings et al. | 260/19 R |
| 2,362,018 | 11/1944 | Mazzucchelli | 260/19 R |
| 2,413,412 | 12/1946 | Mazzucchelli | 260/19 R |
| 3,472,915 | 10/1969 | Rider | 260/19 R |
| 3,761,448 | 9/1973 | Anderson et al. | 260/19 R |
| 3,819,441 | 6/1974 | Fargo et al. | 156/167 |
| 4,070,327 | 1/1978 | Jünger et al. | 260/31.4 R |

FOREIGN PATENT DOCUMENTS

| | | | |
|---|---|---|---|
| 2526935 | 1/1976 | Fed. Rep. of Germany | 260/18 PF |
| 48-34831 | 10/1973 | Japan | 260/19 N |

OTHER PUBLICATIONS

Chem. & Eng. News, vol. 27, No. 10, p. 701, Mar. 7, 1949.

*Primary Examiner*—Ronald W. Griffin
*Attorney, Agent, or Firm*—David Bennett; William J. Farrington; Edward P. Grattan

[57] ABSTRACT

A glass fiber bonding composition suitable for the production of insulation materials comprises a novolac, polyunsaturated fatty acid, and a polyoxyethylene adduct.

13 Claims, No Drawings

GLASS FIBER BONDING RESINS

BACKGROUND OF THE INVENTION

This invention relates to phenol/formaldehyde resins and specifically to certain novolac resins useful as binders for glass fiber insulation materials.

In the production of a typical glass fiber insulation material, loose glass fibers usually derived from textile re-work and/or waste, are first garnetted into a loose mat and then mixed with granules of a binder composition with a mean particle size of 10–30 microns, and passed into a mat former in which the binder granules and the glass fibers are intimately mixed and formed into a mat. This mat is then passed into an oven at from 200°–400° C. There the binder is cured and bonds the glass fibers into a coherent mat.

Among the qualities of the binder that are particularly prized by the user are (a) a low level of dustiness so that the work area is not contaminated and resin usage is minimized; (b) good wettability/bonding of the fibers by the resin which in turn contributes to better resin distribution and the lack of undesirable resin stratification; (c) efficiency i.e. acceptable mat properties at lower resin levels, so that no more resin is used than is necessary; (d); good release properties giving an absence of stickiness to metals during forming and curing steps; (e) good electrical conductivity, so as to avoid electrostatic build-up and thereby reduce the need for cleanups and to improve product uniformity; (f) hydrophobicity, (water repellency), so that the cured mat will not be adversely effected (lower "R" value) by absorbed water; (g) long resin shelf life (stability), that is, no resin advancement and less caking tendency during storage; (h) additives with a low level of toxicity and (i) fast curing characteristics so that resin will be completely cured not only in smaller ovens but also at lower temperatures thus generating energy savings.

This last characteristic, fast curing, is important because the lower the oven temperatures, the lower are the emissions. Resin curing characteristics are of great importance in commercial lines because products manufactured from slow curing resins (generally one-stage resins) usually leave the oven while the exothermic curing reaction is still in progress. Due to the excellent insulation properties of the finished product, this accumulated heat can cause fires in warehouses/railroad cars, etc. In fact, it is a common practice in the industry to store the rolls in the production plants for observation before any shipment is done.

The one-stage resins which are the only currently approved resins for this commercial application lack several of the desirable characteristics listed above to some degree and up to now, no known two-stage resin system has become commercial because the performance of such systems is even less satisfactory than that of the one-stage resins.

The present invention describes a two-stage resin binder formulation that is more than usually effective in all the above respects. Moreover the binder formulation of the invention produces cured mats which have displayed good recovery after compression; absence of product degradation, most significantly in terms of loss of thickness upon storage and/or coating operation; water repellency so as to maintain a high "R" value; high quality bottom and top surfaces free from lumpiness and/or fuzziness; and adequate stiffness.

DISCUSSION OF THE PRIOR ART

A wide variety of phenolic resins have been used as glass fiber binders. Some of these are resoles as for example U.S. Pat. No. 3,208,734 which describes a binder composition comprising a resole, a polymerized unsaturated fatty acid, bone glue and a water-soluble, film-forming starch or starch derivative.

U.S. Pat. No. 3,819,441 also describes resoles used to make glass-fiber insulation materials and includes surface-active agents as desirable components.

In addition oil-modified novolac resins in which a dehydrated novolac resin is reacted with a drying oil at elevated temperatures are disclosed in U.S. Pat. Nos. 2,362,018; 2,413,412. These polymers use amounts of the oil comparable to that of the resin and are essentially copolymers of the oil and the resin. They are said to be useful as molding compositions and as binders for laminates.

The resin compositions described in the above art however are not really adapted for the production of high quality glass fiber insulation materials. By contrast the resin compositions of the invention are extremely well adapted for this use. As will be demonstrated below they show substantial advantages over the products currently available in terms of, for example, efficiency of application; readiness with which they adhere to the glass fibers; hydrophobicity; electrical conductivity so there is less static build-up; less dustiness so that clean-up is easier and less resin is wasted; speed of cure; and dimensional recovery of treated glass fiber mats on compression. These and other advantages will become apparent from the detailed description of the invention that follows.

GENERAL DESCRIPTION OF THE INVENTION

The present invention provides a resin binder composition comprising a novolac resin, from 0.5 to 8% by weight of a polyunsaturated vegetable oil having a polyunsaturated content of at least 40% by wt. and an iodine value of from 80 to 210; and from 0.2 to 2.0% by weight of a polyoxyethylene adduct selected from the group consisting of the adducts of polyethylene glycol with alcohols, ethers, esters and acids.

The composition may with advantage contain other components. Particularly preferred is the incorporation of carbon black particularly a conductive grade carbon black since this improves the conductivity of the bonded material and also gives the black color that is often required in the construction industry, particularly in applications behind suspended ceilings. In "natural" compounds the conductivity may be improved by use of a suitable solid and highly polar plasticizer such as O- or p-toluene sulfonamide, triphenyl phosphate or dicyclohexyl phthalate.

The binder composition when ready to be cured also comprises as a rule a cure promoter to accelerate the rate at which cure occurs and a cross-linker to provide the mechanism by which the resin thermosets. This allows energy saving through the use of lower oven-curing temperatures. Conventional promoters include oxalic acid, borax, maleic acid and malonic acid. Cross-linkers that may be used for typical novolacs include hexamethylene tetramine and paraformaldehyde.

In addition to the above, components such as pigments, stabilizers and dispersing agents (to aid in the application of the resin composition to the glass fibers) can also be present if required.

The novolacs used in the present invention are conventionally made by reacting from about 0.4 to 0.95 mol of aldehyde per mol of phenol under acid catalyzed aqueous phase reaction conditions until a condensation product of aldehyde with phenol having the desired characteristics is produced. The methods of making such preformed novolac resins and the preformed novolac resins so produced are well known to those of ordinary skill in the art.

The term "phenol" and the term "aldehyde" each have established meanings of scope in the art of phenolic resins and are used throughout this disclosure and claims in accordance with their generic art established meanings. Thus, the term "phenol" refers to an aromatic six-membered moiety which is substituted with a hydroxyl group. This moiety can be further substituted with other radicals including alkyl radicals, aryl radicals, halo radicals, (including fluoride, chloride, bromide and iodine), hydroxyl groups and the like as those skilled in the art fully appreciate. A preferred phenol is phenol itself. Similarly, the term "aldehyde" has reference to organic compounds containing the characteristic group:

Examples of suitable aldehydes known to the phenol-aldehyde resin art include aliphatic aldehydes, such as propionaldehyde, acetaldehyde and the like; aromatic aldehydes such as benzaldehyde and the like, cyclic aldehydes such as furfural and the like and mixtures of such. A preferred aldehyde is formaldehyde.

A preferred procedure for making a novolac starting resin for use in the present invention involves refluxing aldehyde and phenol in the afore-indicated mol ratios under aqueous phase conditions with an acidic catalytic material such as sulphuric acid, phosphoric acid, oxalic acid, and the like, for a time of from about 20–140 minutes. Then the mixture is dehydrated under vacuum to about 120°–160° C. and cooled to produce a solid product.

It will be appreciated that the aldehyde to phenol ratios herein described have reference to the total amount of phenol present before a reaction, including the phenol which is substituted.

The polyunsaturated vegetable oil used in the invention has a polyunsaturated acid content of at least 40% by wt. and preferably 60% by wt. A vegetable oil conventionally comprises a mixture of fatty esters. Some of these esters comprise fatty acids comprising multiple unsaturations in the chain. Such esters are known as polyunsaturated. Likewise esters containing a single or no unsaturation are referred to as "monounsaturated" and "saturated" respectively.

The vegetable oils useful in the compositions of the invention, include those set out in Table 1. In general higher unsaturation levels lead to lower viscosity, better dust control and higher reactivity.

TABLE 1

| Vegetable Oils | Polyunsaturated Content (by wt.) | Iodine Value | Sap. Value |
|---|---|---|---|
| safflower | 73% | 140–150 | 188–194 |
| soybean | 59% | 120–141 | 189–195 |
| sunflower | 59% | 125–136 | 188–194 |

TABLE 1-continued

| Vegetable Oils | Polyunsaturated Content (by wt.) | Iodine Value | Sap. Value |
|---|---|---|---|
| walnut | 71% | 135–162 | 189–198 |
| linseed | 68% | 155–205 | 188–196 |
| poppyseed | 64% | 130–140 | 189–196 |

The "saponification value" which is about the same for the oils listed measures the degree of esterification which in turn gives an idea of the polarity of these oils.

The "Iodine Value" is a measure of the degree of unsaturation in the molecule with a higher degree of unsaturation corresponding to a higher "Iodine Value".

The proportion of the vegetable oil in the composition is determined in part by the level of dust control, conductivity, wettability and lubrication required. In practice a weight proportion of 3 to 6% is preferred.

The polyoxyethylene adduct appears to have the effect of increasing the polarity of the composition and thus reducing the electrostatic charge accumulated by the resin. Selection of an appropriate form of the adduct can also improve the dispersibility of the composition of the invention. The adduct can be based on a sorbitan or sorbitol fatty acid ester, or a fatty acid or an alcohol or an ether. The essential feature is the polyoxyethylene component which contributes significantly to the overall polarity of the composition.

The polyoxyethylene adduct is preferably the reaction product of a polyethylene glycol, having from about 4 to 40 and preferably 10–30 ethylene units, with an incomplete fatty acid ester of a polyol having from 3 to 8 C—OH groups, with from 2 to 4 of such groups esterified by a fatty acid having from 14 to 20 carbon atoms.

The preferred incomplete fatty acid ester is based on sorbitol or sorbitan and most preferably the di or tri-ester of sorbitol. The most suitable fatty acid is stearic acid though others such as oleic, palmitic or lauric acid could be used.

The most preferred ethoxylated fatty acid ester is a polyoxyethylene sorbitan tri-stearate having about 20 ethylene units. The adduct is usually added in an amount based on the resin of from 0.2 to 2% by weight such as from 0.25 to 1% by weight.

Because the above polymers tend to be somewhat waxy they are difficult to disperse in the novolac resin. It is therefore convenient to add them in a mixture with a fatty acid partial ester of a polyol such as glycerol which is compatible with the ethoxylated fatty acid ester. A preferred example of such a polar fatty acid ester is glyceryl monostearate but any mono ester of glycerol with a $C_{16}$–$C_{20}$ fatty acid will generally be suitable.

In general the preferred manner of adding the ethoxylated fatty acid ester is as a mixture with a fatty acid partial ester of glycerol in a % by weight ratio of 20:80 to 80:20 and preferably 40:60 to 60:40.

The compositions of the invention may be obtained by polymerizing a novolac resin till a free phenol content of about 7% or less is obtained, then blending in the polyunsaturated vegetable oil and the polyoxyethylated fatty acid ester (along with any polar partial ester associated with it). These components are blended at about 160° C. for 15 minutes or so and finally the blend is flaked and ground to a powder. At this point any further additives required, such as a low molecular weight polyethylene dispersing agent (which also improves water repellency and acts as a lubricant), cross-linking agents, carbon black, stabilizers, colorants and the like may be added.

These compositions are then applied to a glass fiber mat using any convenient procedure including the one described above. A glass fiber mat treated and bonded using a composition according to the invention typically comprises from 10 to 40% and preferably 15 to 25% by weight of the bonding composition.

DESCRIPTION OF THE PREFERRED EMBODIMENTS

The invention is now further described with reference to the following Examples which are for the purpose of illustration only and are intended to imply no limitation to the essential scope of the invention.

EXAMPLE 1

This Example describes a typical process for the production of a composition according to the invention.

A mixture of 1000 gm of phenol and 80 gm of xylol were placed in a reaction vessel along with a solution of 20 gm of oxalic acid in 40 gm of water. The temperature was raised to 40° C. the slow addition of 460 gm of 50% formalin solution was begun and the temperature was raised to reflux level. After about five hours 7.5 gm of prilled urea were added and dehydration of the mixture was begun. After about 6 hours total reaction time the reaction was stopped and 35 gm of safflower oil were added together with 1.0 part of a blend of 60% glyceryl monostearate and 40% polyoxyethylene (20) sorbitan tristearate.

The resin obtained had a melting point of 75° C. and a free phenol content of about 3.5%.

The resin was flaked and ground to a powder and then 100 parts of resin were blended with 7.5 parts of hexamethylene tetramine and 1.5 part of a low molecular weight polyethylene dispersing agent. One part of a toluene sulfonamide plasticizer was added where a "natural" binder was required.

The melting point of the composition was about 80° C. and the stroke cure time at 150° C. was 47 sec.

The stroke cure time is a measure of the rate at which a resin cures. It is determined by placing a sample of the resin on a hot plate at a given temperature. The resin is then worked with a palette knife until the point at which the resin no longer forms "strings" when the knife is lifted from the plate but remains as a rubbery mass on the plate. The time to this point is known as the "stroke cure" time. The test is a somewhat subjective but highly reproducible (by the same operator) indication of the speed of cure of a resin formulation.

A similar formulation containing 3.0 parts of the low molecular weight polyethylene and 2.0 parts of conductive carbon black and 2.5 parts of non-conductive carbon black, had a melting point of about 80° C. and a stroke cure time of 55 seconds.

EXAMPLE 2

The following Example shows a comparison between the physical properties of a commercial novolac and the composition of the invention in use as a binder for a glass fiber insulation material. The comparative novolac is a one stage resin sold by Union Carbide Corporation under the trade designation UC 4491 for precisely this use and is accepted as adequate in the industry. The composition of the invention was made by a process essentially as described in Example 1 and contained.

| | |
|---|---|
| Novolac | 100 parts. |
| Safflower oil | 3.0 parts. |
| 60% glyceryl monostearate | |
| 40% polyoxyethylene (20) sorbitan tristearate | 1.0 part |
| low molecular weight polyethylene | 1.0 part |
| oxalic acid | 0.5 part |
| hexamethylene tetramine | 7.5 parts |
| carbon black (conductive) | 2.5 parts |
| carbon black (non-conductive) | 2.5 parts |

The two compositions, called A (invention) and B (comparative) were applied by the same technique to the same type of glass fiber mat at identical application levels and cured for similar lengths of time.

The following tests were then performed.

WATER ABSORPTION

Similar samples weighin 31 gm were immersed in 500 ml. of water.

A—absorbed 425 gm of water in 26 hours.
B—absorbed all 500 gm of water in 4 hours.
The specimens were drained and weighed.
A—116 gm.
B—176 gm.

The formulation of the invention therefore absorbs much less water. No indication of oil migration to the water was found.

RECOVERY

The samples used above were sandwiched between flat panels and compressed by loads of 25 lbs. After 48 hours the loads were removed and the height and weight of the samples were recorded.

| | A | B |
|---|---|---|
| Recovery Height | 1" | 15/16" |
| Weight | 80 gm | 145 gm |
| Water still absorbed | 49 gm | 114 gm |

RESIN CONTENT

The samples were heated to drive off the water and then ignited to remove the binder composition.

The loss on ignition for each was 21% showing that both had received identical amounts of resin binder composition.

Further parallel tests of the commercial resin against the resin composition of the invention showed that a satisfactory mat product could be obtained at 16–17% of the composition, (as measured by loss on ignition), whereas the commercial resin formulation required at least 20%.

CURE VOLATILES

The resin of the invention (A) was compared with the commercial one stage novolac used above (B) from the point of view of volatiles released on cure. The results are set forth in Table 2 below.

TABLE 2

| Percentage Reduction in weight after exposure (approx) | | | | | |
|---|---|---|---|---|---|
| 177° C. | | 204° C. | | 232° C. | |
| 3 min. | 9 min. | 3 min. | 9 min. | 3 min. | 9 min. |
| Resin A (Invention) | | | | | |
| 3% | 3.5% | 4% | 4.5% | 5.3% | 6.8% |

TABLE 2-continued

| | Percentage Reduction in weight after exposure (approx) | | | | | |
|---|---|---|---|---|---|---|
| | 177° C. | | 204° C. | | 232° C. | |
| | 3 min. | 9 min. | 3 min. | 9 min. | 3 min. | 9 min. |
| Resin B (Commercial) | 7% | 8% | 9% | 9% | 9.4% | 9.8% |

It can therefore be seen that the resin of the invention emits very substantially less volatiles during cure then the commercial resin.

EXAMPLE 3

A resin formulation was prepared in the manner described in Example 1 from the following components:
Phenol—1000 gm
Xylol—80 gm
Oxalic Acid—20 gm
Water—40 gm
50% Formalin—485 gm
Prilled Urea—7.5 gm
Safflower oil—30 gm The resultant resin formulation was divided into two batches C and D that were blended with the following ingredients.

| C (Comparative) Parts by weight | Compound | D(invention) Parts by weight |
|---|---|---|
| 100 | Resin (from above) | 100 |
| 7.5 | Hexamethylene tetramine | 7.5 |
| 1.0 | Low M. Wt. polyethylene | 1.0 |
| 0.5 | Oxalic acid (cure promoter) | 0.5 |
| 0.2 | Pigment (blue) | 0.2 |
| 2.5 | Non-conductive carbon black | 2.5 |
| 2.5 | Conductive carbon black | 2.5 |
| 0 | Polyoxyethylene (20) sorbitan tristearate | 1.0 |

In order to test the relative dust generation of the two formulations in a controlled laboratory environment, 15 gm of each was charged to a Henschel blender along with 50 gm of cut glass fibers. Each blend was mixed for five minutes and the top cover of the blender was examined for dust.

In the case of the blend containing the polyoxyethylene (20) sorbitan tristearate there was substantially less dust than with the blend from which this component was omitted.

EXAMPLE 4 (Comparative)

A resin formulation identical to that of Example 3, with the exception that the safflower oil component was omitted, was compounded into a bonding formulation as follows.

| Resin | 100 |
|---|---|
| Hexamethylene tetramine | 5.5 |
| Ethylene bis stearamide | 1.0 |
| Conductive carbon black | 3.0 |
| Oiled talc | 5.0 |

(All in terms of parts by weight)

This formulation is in general equivalent to that of the invention except for the omission of polyunsaturated oil and the polyoxyethylene adduct.

The binder formulation was applied to a glass fiber net in a commercial operation to assess its suitability as a bonding agent.

After 3 hours of operation the application was discontinued since the bonded product failed to meet specifications. In particular the level of dust generated during the application was unacceptably high; the surface qualities of the mat were unsatisfactory; resin stratification within the mat was observed; the resin application level required was too high; and there was evidence of sensitivity to moisture.

In fact the product obtained was adjudged inferior to that obtained using UC 4491, the single stage resin used as a standard to assess the properties of the formulation of the invention in Example 1.

It is therefore quite clear that the incorporation of the polyunsaturated oil and the polyoxyethylene adduct has a most profound effect on the properties of the bonding resin formulation of the invention.

The above Examples are for the purpose of illustration only and are not intended to imply any limitation on the scope of the invention. It is foreseen that many minor variations and modifications could be made without departing from the essence of the invention. It is intended that all such variations and modifications be embraced within the purview of this invention.

What is claimed is:

1. A resin binder composition comprising a novolac resin; from 0.5 to 8% by weight of a polyunsaturated vegetable oil having a polyunsaturated content of at least 40% by wt. and an iodine value of from 80 to 200; and from 0.2 to 2.0% by weight of a polyoxyethylene adduct selected from the group consisting of adducts of polyethylene glycol with alcohols, ethers, esters and acids.

2. A composition according to claim 1 in which the polyunsaturated vegetable oil is selected from the group consisting of safflower, soybean, sunflower, walnut, linseed and poppyseed oils.

3. A composition according to claim 1 in which the polyunsaturated vegetable oil is safflower oil.

4. A composition according to claim 1 comprising from 3 to 6% by weight of the polyunsaturated vegetable oil.

5. A composition according to claim 1 in which the polyoxyethylene adduct contains from 10 to 30 ethylene units.

6. A composition according to claim 1 in which the polyoxyethylene adduct is selected from the group consisting of the adducts of polyethylene glycol with the fatty acid esters of sorbitan and sorbitol.

7. A composition according to claim 1 in which the polyoxyethylene adduct is present as a mixture with a fatty acid partial ester of a polyol in a weight ratio of 20:80 to 80:20.

8. A composition according to claim 1 in which the polyoxyethylene adduct is present as a mixture with glycerol monostearate in a 40:60 to 60:40 weight ratio.

9. A resin binder composition comprising a novolac resin; from 3 to 6% by weight of safflower oil; and from 0.2 to 2% by weight of the polyoxyethylene (20) adduct of sorbitan tristearate in the form of a blend with glyceryl monostearate in a weight ratio of from 40:60 to 60:40.

10. A composition according to claim 9 that additionally comprises a crosslinking agent.

11. A composition according to claim 9 that additionally comprises a low molecular weight polyethylene dispersing agent.

12. A glass fiber mat bonded with a resin binder composition according to any one of claims 1 to 8.

13. A glass fiber mat bonded with a resin binder composition according to any one of claims 9 to 11.

* * * * *